United States Patent

[11] 3,555,350

[72] Inventor Osamu Okuda
Osaka, Japan
[21] Appl. No. 810,598
[22] Filed Mar. 26, 1969
[45] Patented Jan. 12, 1971
[73] Assignee Sanyo Electric Co., Ltd.
Moriguchi Osaka, Japan
a corporation of Japan
[32] Priority Mar. 30, 1968
[33] Japan
[31] No. 43/21137

[54] PIN-CUSHION CORRECTION APPARATUS FOR TELEVISION RECEIVERS
9 Claims, 10 Drawing Figs.

[52] U.S. Cl. .......... 315/24
[51] Int. Cl. .......... H01j 29/72
[50] Field of Search .......... 315/24

[56] References Cited
UNITED STATES PATENTS
3,440,482 4/1969 Lister et al. .......... 315/24

*Primary Examiner*—Rodney D. Bennett, Jr.
*Assistant Examiner*—T. H. Tubbesing
*Attorney*—Darby & Darby

ABSTRACT: Apparatus for correcting pincushion effect in a television receiver in which two coil systems are used. Each coil system includes a coil which receives a vertical deflection signal and a coil which receives a horizontal deflection signal wound on a magnetic core in an inductive coupling relationship. A permanent magnet is associated with each coil system and the horizontal coils and the vertical coils of the two systems are respectively connected in series. The flux from the permanent magnet of each system aids the flux from the vertical coil of the system during one half of a vertical scanning cycle and opposes the flux from the vertical coil during the other half of the cycle. This effectively lowers and raises the saturation of the core so that the inductance of the horizontal coil is lowered and raised in a corresponding manner affecting the amount of flux induced from the horizontal coil of the system into the vertical coil of the same system to produce the pincushion correction. The two coil systems work alternately during one half of a vertical scanning cycle to produce correction over the whole cycle.

INVENTOR
OSAMU OKUDA
BY Darby & Darby
ATTORNEYS

INVENTOR
OSAMU OKUDA

BY Darby & Darby

ATTORNEYS

INVENTOR
OSAMU OKUDA

BY Darby & Darby

ATTORNEYS

PIN-CUSHION CORRECTION APPARATUS FOR TELEVISION RECEIVERS

This invention relates to improvements in or relating to pincushion correction apparatus for television receivers or the like.

PRIOR ART

Pincushion distortion is caused by the fact that the vertical amplitude of a raster at the center thereof is $\Delta V$ short as shown in FIG. 1. As is well known in the art, such distortion is corrected by changing the vertical deflection angle so as to make it maximum at the center part of the horizontal scan. More specifically, the correction can be achieved by substantially linearly varying a parabolic current of horizontal scanning period corresponding to the curve of the current of the vertical scanning line so that the vertical deflection current is increased in the negative direction during the first half of the vertical scan cycle (field) while it is increased in the positive direction during the second half of the vertical scan cycle. This is shown in FIG. 2 where the vertical scanning current has a total amplitude $Iy$ going from a maximum negative value through zero to a maximum positive value and a correction $\Delta Iy$ at the horizontal scanning frequency $f_H$ is superimposed. Here, $\Delta Iy$ equals $\Delta V$, the voltage of the correction divided by S, the resistance of the vertical scanning circuit.

In order to obtain the correction waveform of FIG. 2, there have heretofore been proposed several circuit systems using a parabolic current modulated with a vertical deflection waveform or utilizing a balanced diode modulator. Another conventional method is to perform the horizontal modulation with the aid of a saturable reactor type transformer, as shown in FIGS. 3 and 4.

PRESENT INVENTION

It is a primary object of the present invention to make it possible to easily correct upper and lower pincushion distortions separately. In accordance with the present invention, upper and lower pincushion distortions can be easily corrected separately, and there is no need to use variable resistors which have been required in an attempt to correct both upper and lower distortions with the conventional apparatus. This constitutes a great advantage in that the apparatus according to the present invention can be miniaturized, made light in weight and manufactured at low cost. Especially with the arrangement which will be shown as the preferred embodiments, it is possible to improve the temperature characteristics of the deflection circuit as a whole sine the magnetic current of the present invention is not a closed one like the prior art apparatus.

In accordance with the present invention, two coil systems are used each of which comprises respective coils for receiving the horizontal and vertical deflection signals wound in a coupling relationship on a respective magnetic core with a respective permanent magnet. The two horizontal deflection signal receiving coils and the two vertical deflection signal receiving coils are connected in series. The permanent magnet of each system is adjusted to alternately aid and oppose the flux from the vertical coil of its system during respective halves of the vertical scanning cycle and the two coil systems work opposite to each other. Thus, the flux from the vertical coil and the permanent magnet of one system will saturate the respective core and lower the inductance of the horizontal coil of that system while the other coil system has its core driven toward the unsaturated region to raise the inductance of the horizontal coil of that system. The horizontal coil of the first system with lower inductance couples little or no flux into the corresponding vertical coil to provide the correction while the horizontal coil of the other system is coupling a larger amount of flux. By doing this, there are maximum amounts of correction applied at the beginning and end of the vertical scanning cycle with lesser amounts in between.

Other objects, features and advantages of the present invention will become apparent from the following description taken in conjunction with the accompanying drawings, in which.

Figure 1:
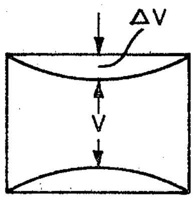
FIGS. 1 and 2 are views useful for explaining pincushion type distortion.
Figure 2:
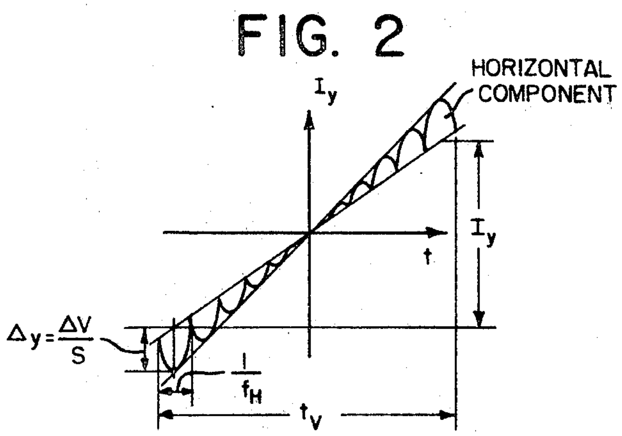
Figure 3:
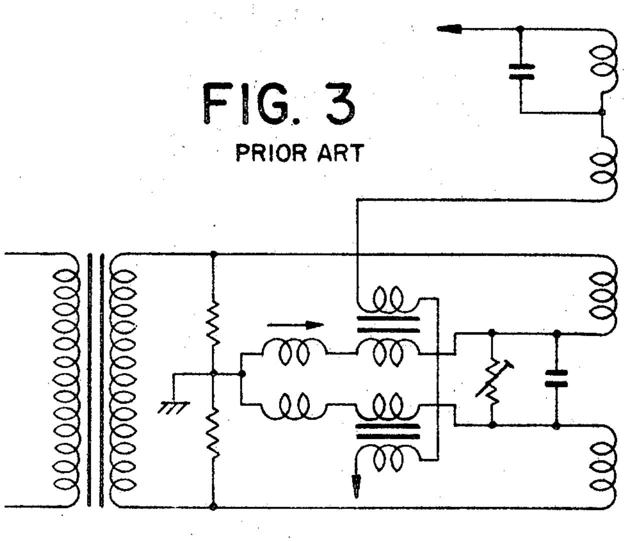
FIG. 3 PRIOR ART
FIGS. 3 and 4 are diagrams showing a correcting circuit and a correcting device useful for explaining the apparatus according to the present invention.
Figure 4:
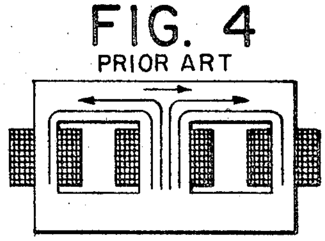
FIG. 4 PRIOR ART

Referring to the drawings, description will now be made of the preferred embodiments of the present invention.

Figure 5:
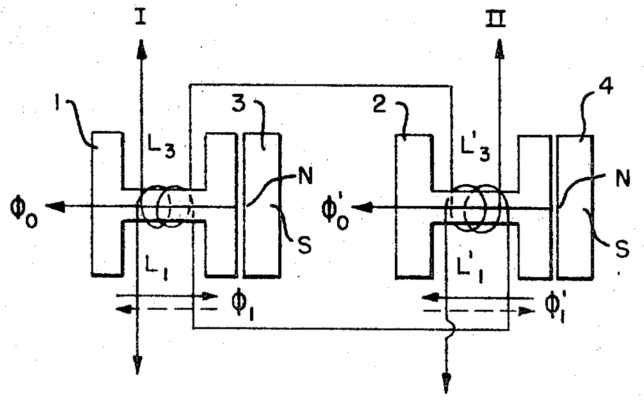
FIG. 5 is a diagram showing the principle of a pincushion correction apparatus according to the present invention.

The pincushion type distortion and correcting device shown in FIGS. 1 to 4 are described in detail in U.S. Pat. No. 3,346,765. Therefore detailed description thereof will be omitted, and the principle, operation and effect of the apparatus according to the present invention shown in FIG. 5 will be described in detail.

The pincushion correction apparatus according to the present invention includes a pair of magnetic cores 1 and 2 formed of ferrite or the like each of which is H-shaped in cross section and has a winding portion which can easily be magnetically saturated. Provided on the magnetic cores 1 and 2 are first and second coil systems I and II respectively which comprise closely coupled "vertical" and "horizontal" coils $L_1$, $L_3$ and $L_1'$, $L_3'$ respectively. Further permanent magnets 3 and 4 are adjustably provided in opposing relationship to the end surfaces of the magnetic cores 1 and 2 respectively. Coils $L_1$ and $L_1'$ are designated the "vertical" coils since they are connected (not shown) to receive the vertical deflection current. Similarly coils $L_3$ and $L_3'$ are designated the "horizontal coils" because they are connected (not shown) to receive the horizontal deflection current.

The coils $L_1'$ and $L_1'$ are connected in series with each other and similarly the coils; $L_3$ and $L_3'$ are connected in series with each other. The coils are wound on the two cores with coils $L_1$ and $L_3$ on core 1 in closely coupled relationship and coils $L_1'$ and $L_3'$ on core 2 in closely coupled relationship; so that the direction of magnetic flux induced in the "vertical" coil ($L_1$ or $L_1'$) by the respective "horizontal" coil ($L_3$ or $L_3'$) in one of the coil systems is opposite to that in the other coil system. More specifically, a series connection is established between the "horizontal" coils $L_3$ and $L_3'$ and between the "vertical" coils $L_1$ and $L_1'$ so that the direction of magnetic flux induced in the "vertical" coil $L_1$ by the "horizontal" coil $L_3$ in the first coil system I is opposite to the direction of magnetic flux induced in the "vertical" coil $L_1'$ by the "horizontal" coil $L_3'$ in the second coil system II. Furthermore, the permanent magnet 3 (or 4) associated with the first coil system I (or second coil system II) is so disposed that the direction of magnetic flux $\Phi_1$ (or $\Phi_1'$) resulting from a current flowing through the "vertical" coil $L_1$ (or $L_1'$) of the first coil system I (or second coil system II) becomes the same as (or opposite to) the direction of magnetic flux $\Phi_0$ (or $\Phi_0'$) emanating from the permanent magnet 3 (or 4). It will readily be appreciated that upon reversal of the polarity of the vertical deflection current, the aforementioned relationship will completely be reversed.

Figure 8:
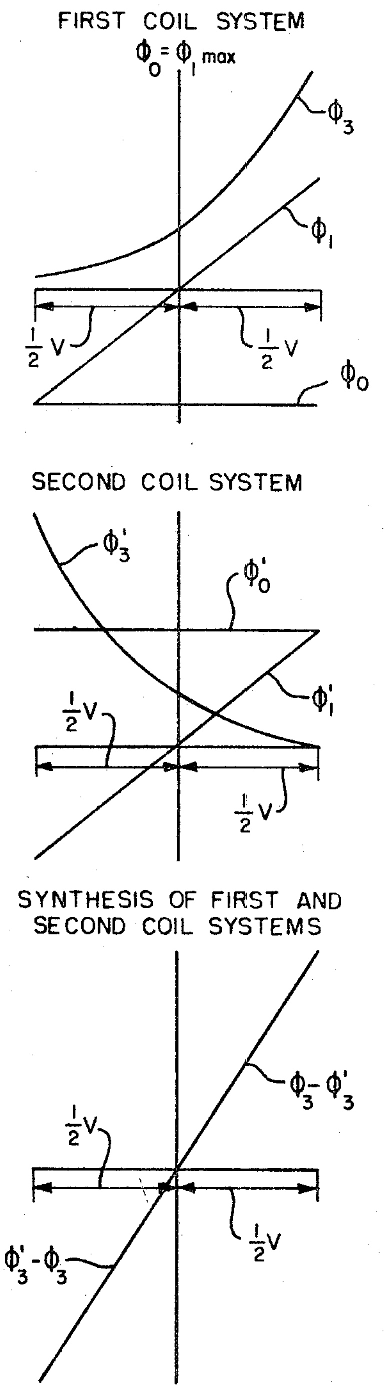
FIGS. 8 to 10 are views useful for explaining the operation of the present apparatus.
Figure 9:
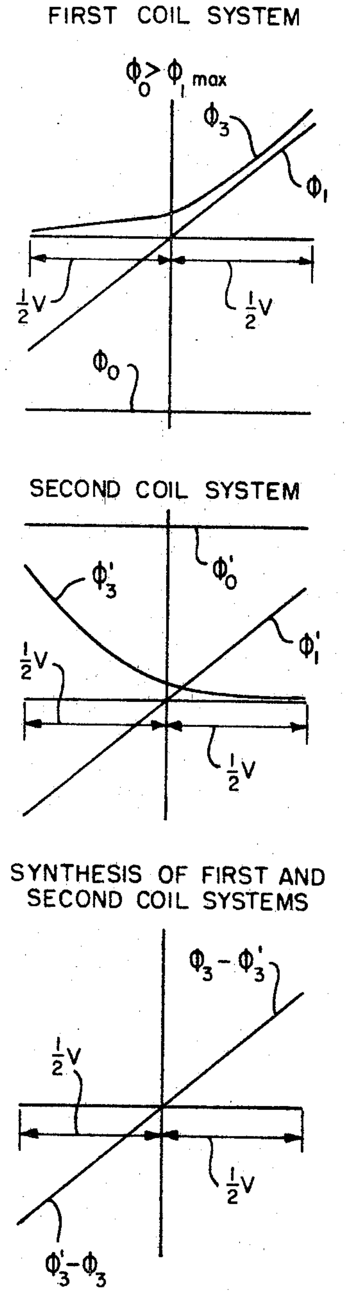
Figure 10:
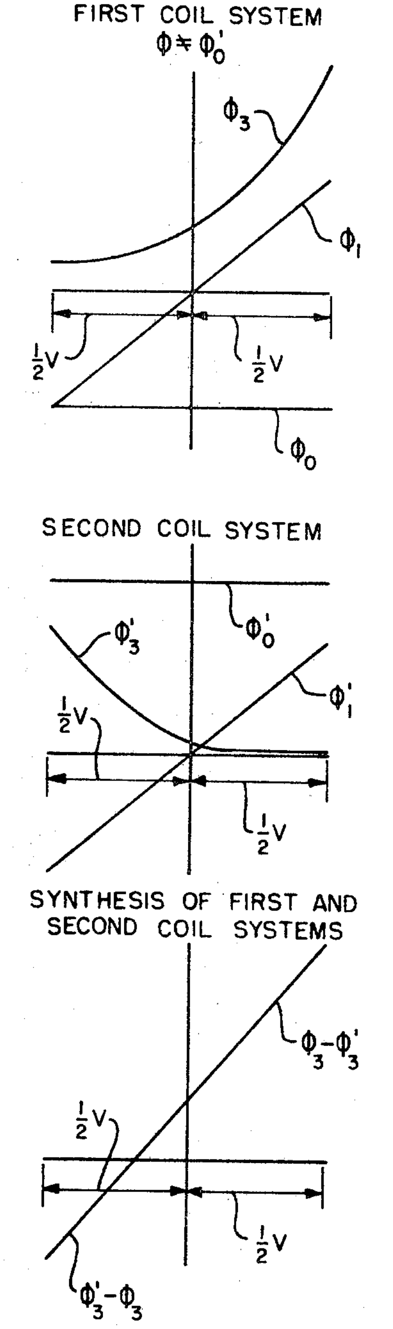

The present apparatus operates as follows: When there is no vertical deflection current flow through the vertical coils $L_1$ and $L_1'$, a voltage induced in the "vertical" coil $L_1$ by magnetic flux resulting from a horizontal deflection current flowing through the "horizontal" coil $L_3$ and a voltage induced in the "vertical" coil $L_3$ and a voltage induced in the "vertical" coil $L_1'$ by magnetic flux resulting from a horizontal deflection current flowing through the "horizontal" coil $L_3'$ cancel each other out so that no correction is effected with respect to vertical deflection. This condition of no vertical deflection correction occurs during the intermediate part of the vertical scanning. When the vertical deflection current has its maximum negative value during the first half of the vertical scanning field, the magnetic flux $\Phi_1$ emanating from the "vertical" coil $L_1$ and the magnetic flux $\Phi_0$ from the permanent magnet 3 are directed in opposite directions while the magnetic flux $\Phi_1'$ emanating from the "vertical" coil $L_1'$ and the magnetic flux $\Phi_0'$ from the permanent magnet 4 are directed in the same direction. The relative directions of the flux lines are shown by the solid lines adjacent the flux designations ($\Phi$) in FIG. 5. Under these conditions, in the second coil system II the magnetic core 2 is magnetically saturated while the core 1 of the first system I is not saturated, meaning that the coils therein will have a higher inductance. This magnetic saturation of the second coil system continues until the vertical deflection current reaches its intermediate value. During the time from maximum negative to the intermediate value, the inductance of the "horizontal" coil $L_3'$ of the second coil system is decreased due to the saturation of core 2 so that the magnetic flux emanating therefrom is correspondingly decreased, while the inductance of the "horizontal" coil $L_3$ of the first coil system is increased so that the magnetic flux emanating therefrom is correspondingly increased. Consequently, a horizontal deflection current substantially corresponding to the difference ($\Phi_3$—$\Phi_3'$) between the magnetic fluxes emanating from the "horizontal" coils $L_3$ and $L_3'$ of systems I and II is superimposed upon the current flowing through the "vertical" coils which are connected in series with each other. As shown in FIGS. 8—10, $\Phi_3$ is the flux which is induced into "vertical" coil $L_1$ by "horizontal" coil $L_3$ of the first coil system and $\Phi_3'$ is the flux which is induced into "vertical" coil $L_1'$ by the "horizontal" coil $L_3'$ of the second coil system. This correction flux decreases toward the middle of the scanning cycle since the vertical flux $\Phi_1$ decreases and permits the core 1 to go toward saturation thereby lowering $\Phi_3$. During the other half of the vertical field, when the vertical scanning current goes from the intermediate value to maximum positive value, the flux $\Phi_1$ from vertical coil $L_1$ and the magnetic flux $\Phi_0$ from permanent magnet 3 are in the same direction and the flux $\Phi_1'$ from vertical coil $L_1'$ and $\Phi_0'$ from permanent magnet 4 are in opposite directions. This is shown by the dotted lines of FIG. 5. This results in core 1 of system I being saturated with the "horizontal" coil $L_3$ having minimum inductance. Core 2 of system II is unsaturated so that "-horizontal" coil $L_3'$ has increased inductance. This means that the flux $\Phi_3'$ is greater than the flux $\Phi_3$ so that a horizontal deflection current corresponding to the difference ($\Phi_3' - \Phi_3$) is induced into the vertical coils $L_1$ and $L_1'$ in series. This induced current will be opposite in sign to the current induced during the first portion of the vertical field.

Such effect can be appreciated from FIGS. 8 and 9. Referring to FIG. 8, there is shown the case where the magnetic flux emanating from both the permanent magnets is substantially equal to each other and also substantially equal in quantity to the maximum magnetic flux from the respective "vertical" coils. The top drawing of FIG. 8 shows the effect of the first coil system I over the complete vertical field V where the flux $\Phi_1$ goes from maximum negative through the intermediate value to the maximum positive value. The line $\Phi_3$ indicates the flux produced by "horizontal" coil $L_3$ which is induced into the vertical coil. The middle FIG. shows the second coil system II with $\Phi_1'$ the flux of the "vertical" coil $L_1'$,$\Phi'$ the flux of the permanent magnet 4 and $\Phi_3'$ the flux produced by the horizontal coil $L_3'$ which is induced into the "vertical" coils by the "horizontal" coils. The bottom FIG. shows the total correction flux available from the "horizontal" coils $L_3$ and $L_3'$ over the complete vertical scanning field. It should be understood that this is the peak component of the horizontal flux so that the actual correction to the vertical field would be modulated at the horizontal scanning rate (15,750 Hz.) in the manner shown in FIG. 2. Thus, the correction is produced.

Referring to FIG. 9, there is shown the case where the magnetic flux $\Phi_0$ and $\Phi_0'$ emanating from permanent magnets is substantially equal but is higher than the maximum magnetic flux $\Phi_1$ max. and $100_1'$ max. from the respective "vertical" coils. The three FIGS. correspond to the same information shown in FIG. 8. In this case, the total quantity of correction, shown in the lower FIG., is less than that in the case of FIG. 8. Here again, the total correction of the lower FIG. is a flux pattern which is modulated at the horizontal scanning rate. This means that the larger the magnetic flux emanating from the magnets, the smaller the quantity of correction.

Referring to FIG. 10, there is shown the case in which the magnetic flux from each permanent magnet is different in magnitude for the two coil systems. In the case shown, where $\Phi_0$ is less than $\Phi_0'$ so that $\Phi_0'$ is greater than $\Phi_1'$ max., the quantity of correction becomes different for the first and last half of the scan with the correction flux shown in the lower FIG. shifted to the left of the intersection of the X and Y axes of the FIG. and up. If $\Phi_0$ is greater then $\Phi_0'$ and $\Phi_1$. then the correction flux would be shifted to the right of the intersection and down. Again, the correction flux would be modulated at the horizontal scanning rate. FIG. 10 illustrates that in case unbalance occurs in the upper and lower pincushion distortions between the first and the last half of the horizontal scan, it is possible to individually and independently correct such unbalanced pincushion distortions merely by adjusting the flux from either one of the permanent magnets.

Figure 6:
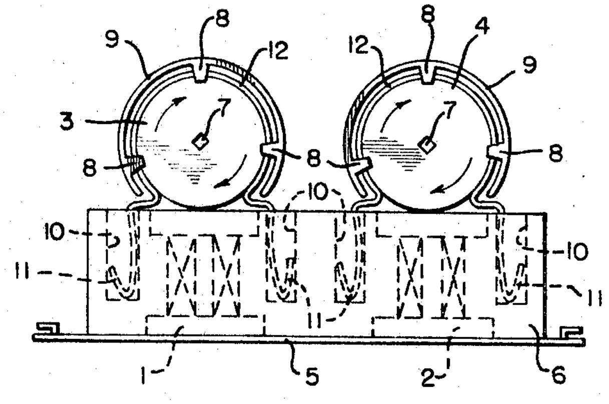
FIGS. 6 and 7 are side views showing two different embodiments of the present invention respectively.
Figure 7:
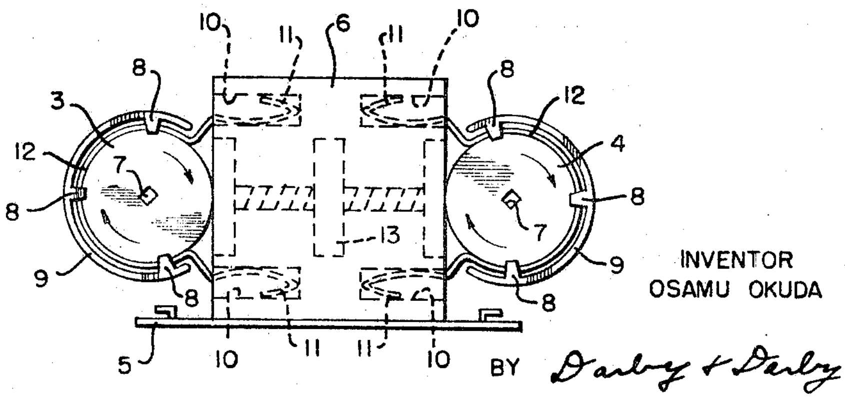

FIGS. 6 and 7 show preferred embodiments of the correction devices according to the present invention. In the device of FIG. 6, first and second coil systems I and II are juxtaposed in a mounting member 6 provided on a base plate 5. The permanent magnets 3 and 4 are of circular form and are each formed with an adjustment recess 7. The magnets 3 and 4 and are supported rotatably with respect to the magnetic cores 1 and 2 on the mounting member 6 by nonmagnetic bands 9 having bent portions 8 engaged with the end surfaces of the magnets and other nonmagnetic bands 12 having leg portions 11 inserted in recesses 10 formed in the support member 6, respectively. The cores 1 and 2, which are preferably of ferrite material, are shown in the member 6 with the respective horizontal and vertical windings thereon. The connections of these windings are not shown.

In the example shown in FIG. 7, the magnetic cores for the first and second coil systems are unitarily formed of ferrite in such a manner as if two separate cores are disposed in back-to-back relationship to each other. An axial relatively thick center flange 13 of nonmagnetic material is provided to prevent interference between the permanent magnets 3 and 4 on the opposite sides. The mounting of the permanent magnets and other parts are substantially the same as those of FIG. 6, and therefore indicated by like reference numerals.

In the experiments performed, use was made of H-shaped cores Model $D_2$-DBN manufactured by Taiyo Yudensha of Japan, with the diameter of the opposite end surfaces being 14 mm, the diameter of the winding portion 6 mm, the thickness of the left-hand side surface 1.5 mm, the thickness of the right-hand side surface 2.5 mm. The length of the winding portion of the cores was 2.5 mm, an 70 turns of "horizontal" coils (0.35 $\Theta$) (having an electrical resistance of 0.71 $\Omega$) and 70 turns of "vertical" coils (0.26 $\Theta$) (having an electrical resistance of 0.92 $\Omega$) were wound on each core. The "vertical" coils were connected in series and the "horizontal" coils were also connected in series. A pulse voltage of 100 Vpp was imparted from the third winding of a flyback transformer to the "horizontal" coils, and there was obtained a correction voltage of 120 Vpp at maximum and 2.5 Vpp at minimum. Using the structure of FIG. 7, a pulse voltage of 50 Vpp was applied to the horizontal deflection coil, and there was obtained a correction voltage of 100 Vpp at maximum and 1 Vpp at minimum. In accordance with the foregoing two embodiments of the present invention, it is possible to utilize deflection correcting magnets for black-and-white television receivers as the magnets for use in the present apparatus.

I claim:

1. A pincushion correction apparatus for a television receiver comprising first and second coil systems each including a saturable magnetic core, a "vertical" coil adapted for connection to receive the vertical deflection signal current and a "horizontal" coil adapter for connection to receive the horizontal deflection signal current, the "horizontal" and "-vertical" coils of each respective system being wound in closely coupled relationship on a saturable winding portion of said magnetic core, said "vertical" coils being respectively connected in series with each other and said "horizontal" coils being respectively connected in series coils each other so that the magnetic fluxes induced in the "vertical" coils by the "-horizontal" coils are directed in opposite directions in the respective coil systems, and a respective permanent magnet associated with each magnetic core for producing a magnetic flux to act with the magnetic flux resulting from the current flowing through the "vertical" coil of the system, the direction of the flux from each permanent magnet aiding the flux from the "vertical" coil during one half of the vertical deflection cycle and opposing the flux from the vertical coil during the other half of the cycle with the two systems working in an opposed relationship so that the core of one system is being driven toward magnetic saturation while the core of the other system is being driven in the opposite direction thereby lowering the amount of flux produced by the "horizontal" coil for coupling to the "vertical" coil of the system whose core is being driven toward saturation and increasing the amount of flux produced by the "horizontal" coil of the other system, the permanent magnet of at least one one of said systems being adjustable to control the amount of flux applied to its respective system.

2. Apparatus as set forth in claim 1 wherein the permanent magnets of both said systems are adjustable.

3. Pincushion correction apparatus for a television receiver comprising:

first and second coil systems, each of said coil systems including a vertical coil in which the vertical deflection current flows;

a horizontal coil in which the horizontal deflection current flows, said vertical coils of said coil systems being connected in series with each other and said horizontal coils of said coil system being connected in series with each other;

a magnetic core having a saturable portion, said vertical coil and said horizontal coil of the respective coil systems being wound in closely coupled relationship on directly the saturable winding portion of said magnetic core, so that the magnetic fluxes induced in said vertical coils by said horizontal coils are directed in opposite directions in the respective coil systems; and permanent magnet means associated with said magnetic core to provide magnetic flux to said core.

permanent magnet means associated with said magnetic core to provide magnetic flux to said core.

4. Apparatus as in claim 3 wherein each coil system has a separate magnetic core with a saturable portion, and a respective permanent magnet means associated with each core.

5. Apparatus as in claim 4 wherein each said permanent magnet is in contact with a respective core.

6. Apparatus as in claim 4 wherein each said core is generally H-shaped, the saturable portion of each said core on which a respective coil system is wound being of a smaller diameter than the end portions of the respective cores, and a respective permanent magnet means associated with each core.

7. Apparatus as in claim 4 wherein each said permanent magnet means is rotatable to control the flux in a respective core.

8. Apparatus as in claim 3 wherein said core is generally H-shaped, the saturable portion of said core on which said coils are wound being of smaller diameter than the end portions of the core.

9. Apparatus as in claim 3 wherein said permanent magnet means is rotatable to control the flux in said core.

PO-1050
(5/69)

UNITED STATES PATENT OFFICE
CERTIFICATE OF CORRECTION

Patent No. 3,555,350 Dated January 12, 1971

Inventor(s) Osamu Okuda; Assignee: Sanyo Electric Co., Ltd.

It is certified that error appears in the above-identified patent and that said Letters Patent are hereby corrected as shown below:

Col. 2, line 40: for "coils $L_1$'" (first occurrence) read --coils $L_1$ --

Claim 1: col. 5, line 3: for "adapter" read --adapted--

Claim 1; col. 5, line 9: for "coils" read --with--.

Signed and sealed this 7th day of December 1971.

(SEAL)
Attest:

EDWARD M.FLETCHER,JR.
Attesting Officer

ROBERT GOTTSCHALK
Acting Commissioner of Patents